April 7, 1936.  T. A. BARRENTINE ET AL  2,036,911
FARM TRACTOR UNIVERSAL DRAWBAR
Filed June 10, 1935  2 Sheets-Sheet 2
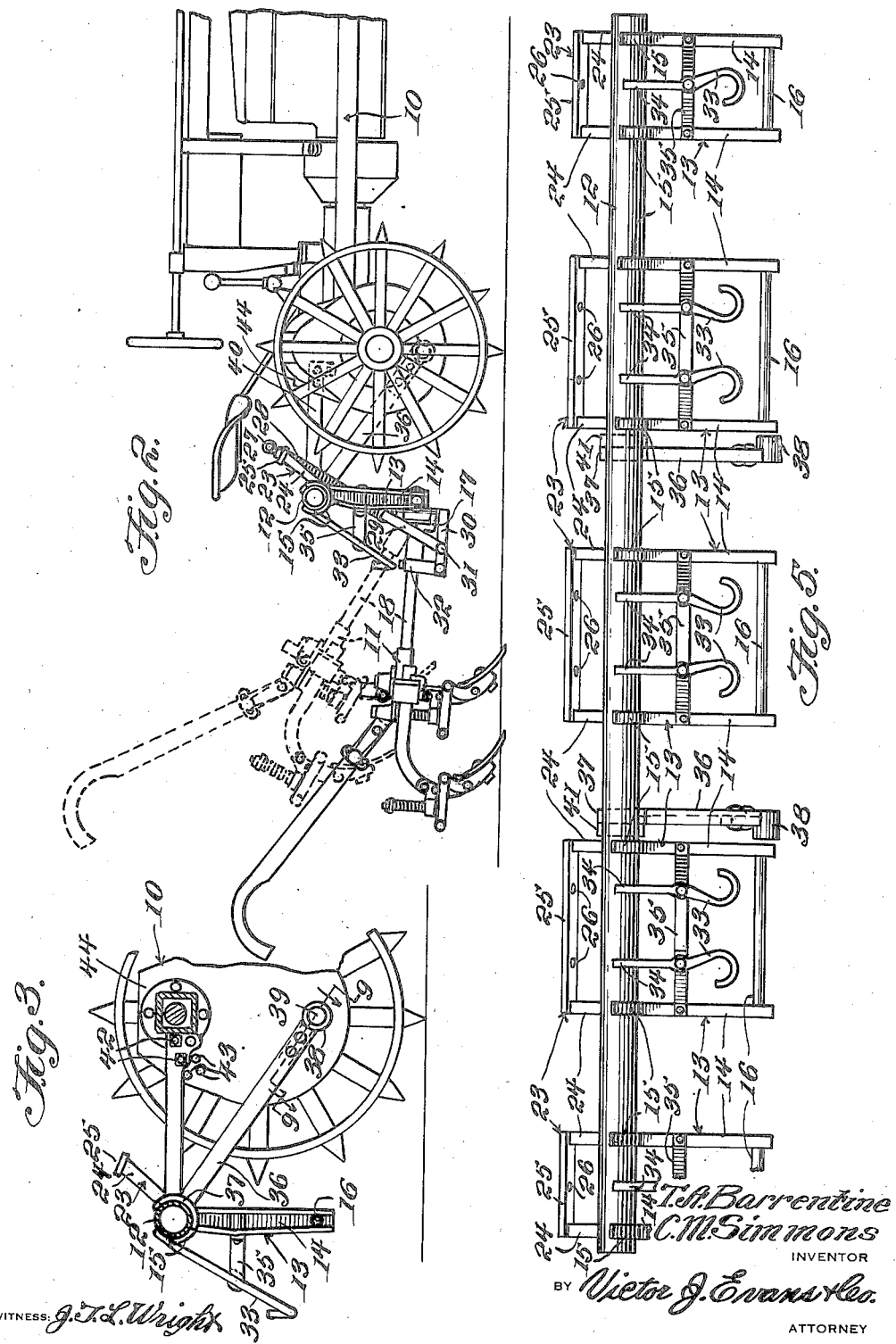

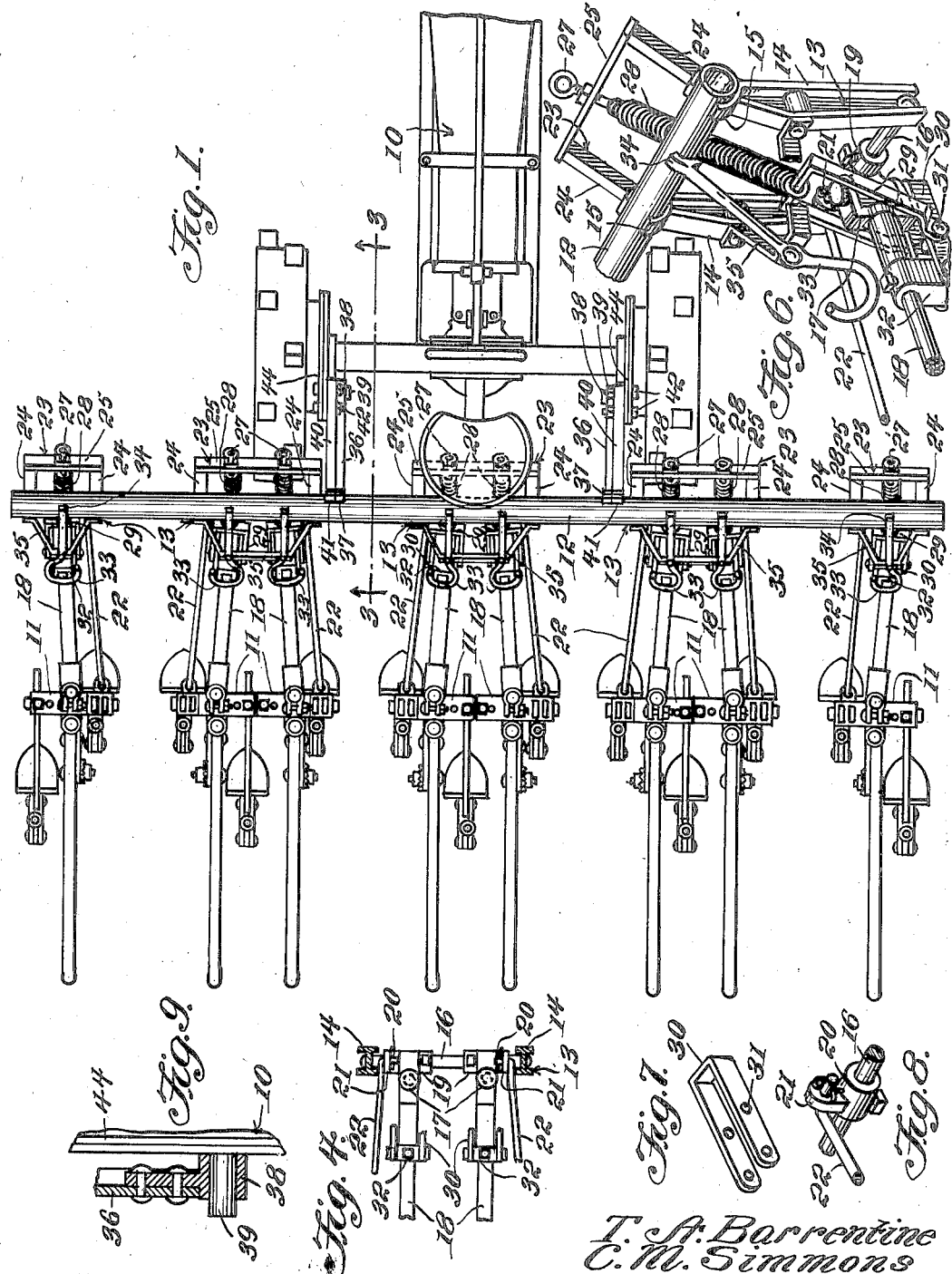

Patented Apr. 7, 1936

2,036,911

UNITED STATES PATENT OFFICE 2,036,911

FARM TRACTOR UNIVERSAL DRAWBAR

Thomas A. Barrentine and Charles M. Simmons, Greenwood, Miss.

Application June 10, 1935, Serial No. 25,935

2 Claims. (Cl. 97—47)

This invention relates to draw bars for tractors and has for an object to provide a draw bar having axles to pivotally secure the beams of cultivators to the draw bar and having hooks above the axles for holding the cultivators raised from the ground when not in use.

A further object is to provide a draw bar having frames to which the tensioning springs of the cultivators may be secured in such manner as to be easily reached for adjustment.

A further object is to provide a draw bar having no moving parts to get out of order, all of the various parts being rigidly secured as a unitary assembly with the draw bar.

A further object is to provide a strong, durable and inexpensive draw bar which will be formed of a few, simple parts that will be inexpensive to manufacture and will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of a draw bar constructed in accordance with my invention in operative position to secure cultivators to a tractor.

Figure 2 is a side elevation of the parts shown in Figure 1.

Figure 3 is a cross section taken on the line 3—3 of Figure 1.

Figure 4 is a fragmentary sectional view through one of the frames showing cultivator beams pivotally secured to the axle of the frame.

Figure 5 is a rear elevation of the draw bar.

Figure 6 is a detail perspective view showing the manner of attaching a cultivator to the draw bar.

Figure 7 is a detail perspective view of the lever for tensioning the cultivator spring.

Figure 8 is a detail perspective view showing the collar of a cultivator brace attached to the axle.

Figure 9 is a fragmentary sectional view taken on the line 9—9 of Figure 3.

Referring now to the drawings in which like characters of reference designate similar parts in the various views, 10 designates a conventional tractor and 11 designates conventional cultivators. As best shown in Figure 5 the cultivators are attached to the tractor by means of a tubular draw bar 12 which is of sufficient length to accommodate a gang of cultivators, ten cultivators being shown by way of example in Figure 1. The draw bar is equipped with a plurality of frames 13 each comprising I beam side members 14, as best shown in Figures 4 and 6, the upper ends of which are provided with arcuate seats 15 which receive the beam 12 and are preferably welded or otherwise rigidly secured to the beam. An axle 16 connects the lower ends of the side members of each frame. The axle is disposed in the vertical plane of the draw bar directly below and parallel with the draw bar and the axles of all of the frames are in alignment. The axle pivotally receives the clevis 17 of the cultivator beam 18. Stop collars 19 and 20 are mounted on the axle on opposite sides of the clevis and the stop collar 20 is provided with a perforated lug 21 to receive the hooked end of the cultivator brace 22.

A plurality of frames 23 are secured to the draw beam 12 each comprising side members 24 which are welded or otherwise rigidly secured to the draw bar and extend obliquely upward from the draw bar, and a cross member 25 which connects the upper ends of the side members and is provided with a central opening 26 to receive the eye bolt 27 to which the tensioning spring 28 of the cultivator is attached. As best shown in Figure 5 the frames 23 are preferably formed to receive single cultivators at the ends of the draw bar and to receive a pair of cultivators intermediate the ends of the draw bar and where a frame receives a pair of cultivators of course there will be a pair of the openings 26 formed in the cross members 25. As usual the tensioning spring 28 of a conventional cultivator is equipped with a yoke 29 which is pivotally connected to a U-shaped lever 30 as shown at 31 and the lever is pivoted to a fulcrum block 32 on the beam 18 whereby when the lever is swung from the position shown in Figure 6 to a position on the opposite side of the fulcrum block the spring will be tensioned to lift the cultivator and form a shallower cut.

A plurality of hooks 33 are provided with arcuate seats 34 which are welded or otherwise rigidly secured to the draw beam 12 and the hooks correspond in number to the number of cultivators to be carried by the draw bar. The hooks support all of the cultivators, or any of them, when not being used as for instance if only two rows are to be cultivated the other cultivators need not be disconnected from the draw bar but can be lifted out of contact with the ground and suspended on these hooks until it is desired to use them.

A cross brace 35 is terminally connected to the side members 14 of each of the frames 13 and is rigidly connected intermediate the ends to the shanks of the hooks 33. These braces extend at substantially a right angle to the side members 14 and space the hooks outwardly and rearwardly from the side members as well as below the draw beam 12.

For attaching the draw beam to the tractor, a pair of coupling links 36 are provided with arcuate seats 37 which are welded or otherwise rigidly secured to the draw bar 12, as best shown in Figure 3, and are equipped with sleeves 38 which are inserted over the usual draw bar lug 39 on the tractor 10. A pair of forwardly extending coupling bars 40 are provided with arcuate seats 41 which are welded or otherwise rigidly secured to the draw bar 12. The forward ends of the coupling links 40 are adjustably secured to the tractor by means of pins 42 which are interchangeably received in openings 43 formed in the housing 44 of the tractor. There will be of course some variations in the construction and attaching means of the coupling links 36 and 40 to conform to the particular type of tractor being used with the draw bar.

It will be noted that there are no moving parts to the draw bar assembly above described. The frames preferably are welded or brazed to the tubular draw bar 12 but of course may be otherwise secured to the draw bar to support the cultivators in operative or in released position as described.

From the above description is is thought that the construction and operation of our invention will be fully understood without further explanation.

What is claimed is:

1. Apparatus for attaching cultivators to a tractor comprising a transversely extending draw bar, coupling links secured to the draw bar and extending forwardly from the bar for securing the bar to a tractor, frames connected to the draw bar and extending above and below the bar for securing cultivators to the bar, hooks secured to the bar for holding the cultivators raised from the ground when not in use, and braces carried by certain of the frames and connected to the hooks for reenforcing the hooks against displacement.

2. Apparatus for attaching cultivators to a tractor comprising a transversely extending tubular draw bar, frames projecting from one side of the bar and provided with openings for attaching the tensioning springs of cultivators to the frames, frames projecting from the opposite side of the bar and including axles for pivotally securing the beams of the cultivators to the draw bar, cross braces carried by the last named frames and extending at an angle to the frames, and hooks secured to the draw bar and to the braces and adapted to engage the beams of the cultivators and hold the cultivators raised from the ground when not in use.

THOMAS A. BARRENTINE.
CHARLES M. SIMMONS.